United States Patent
Foster (10) Patent No.: US 7,357,098 B2
(45) Date of Patent: Apr. 15, 2008

(54) COMPACT ELEVATED PET BATH

(76) Inventor: Jody R. Foster, 2163 Cumbre Pl., El Cajon, CA (US) 92020

( * ) Notice: Subject to any disclaimer, the term of this patent is extended or adjusted under 35 U.S.C. 154(b) by 266 days.

(21) Appl. No.: 11/205,818

(22) Filed: Aug. 16, 2005

(65) Prior Publication Data

US 2007/0039559 A1 Feb. 22, 2007

(51) Int. Cl.
*A01K 29/00* (2006.01)
(52) U.S. Cl. ....................................... 119/673
(58) Field of Classification Search ................ 119/756, 119/751, 752, 673, 753, 754, 757, 676; 4/538–540, 4/549, 548, 551, 553, 555, 592–595
See application file for complete search history.

(56) References Cited

U.S. PATENT DOCUMENTS

| | | | | |
|---|---|---|---|---|
| 5,255,400 A | * | 10/1993 | Sween | 4/556 |
| 5,634,440 A | * | 6/1997 | Mogck | 119/847 |
| 5,662,069 A | * | 9/1997 | Smith | 119/665 |
| 5,794,570 A | * | 8/1998 | Foster et al. | 119/756 |
| 6,237,537 B1 | * | 5/2001 | Winchester | 119/673 |
| 6,516,752 B2 | * | 2/2003 | Batterton | 119/650 |
| 6,553,943 B1 | * | 4/2003 | Murphy | 119/673 |

\* cited by examiner

*Primary Examiner*—Thomas Price
(74) *Attorney, Agent, or Firm*—Richard D. Clarke (57) ABSTRACT

The present invention is directed to a light weight booster bath that will consist of a two-piece reinforced tub unit, removable legs, drain hose, spray nozzle, utility basket, three-piece adjustable leash system with collar and assembling hardware that will fit within the nested upper and lower portion of the tub. Optional leg stabilizers and access stairs can also be part of the package additionally fitting within the nested upper and lower portion of the tub. A unique three-piece adjustable leash system will be attached to the combined tub sections by eyebolts. When using the three-piece adjustable leash system the pet is kept centrally located within the tub and cannot move from side to side. A quick disconnect swivel snap coupler is attached to the collar so the collar can be put on the pet before moving the pet into the tub.

18 Claims, 5 Drawing Sheets

COMPACT ELEVATED PET BATH

FIELD OF THE INVENTION

This invention relates to the field of portable apparatus used for the washing and grooming of pets. More specifically this patent deals with an apparatus that will relieve the strain incurred while bending over and trying to bathe a pet in a shower, bathtub, laundry tub or out on the lawn.

BACKGROUND OF THE INVENTION

All pets in general require periodic bathing and grooming to keep them in good health. Dogs in particular are more difficult because of their often-larger sizes and physical strength. Generally, in the home the pets are washed in a shower, bathtub, and laundry tub or just out on a lawn. This can be an arduous task with a great deal of bending over; kneeling and lifting even with small pets. Often the person doing the bathing gets just as wet as the pet being bathed. Small pets present the difficulty of just holding them in one position to bathe them. Most conventional indoor facilities, i.e. home bathtubs, that can be used for washing pets are often very slippery to stand on, making the job even more difficult and producing more trauma on the pet. Some pets that become very upset when being bathed will often urinate or worse which can increase the problems when the pets are bathed in the house. When pets are washed and groomed, especially in the summer, they are loosing a great deal of hair that can clog drains and cause expensive plumbing problems in the house.

Dogs want to shake after a bath and with no means of restrain them; this can make a mess in the house if this occurs. Further, if the pet is given a final rinse with a flea dip or similar application in indoor facilities, the facilities must be cleaned very carefully before being used by the family. If the flea dip is shaken by the pet in the house, it can cover both the floors and walls. Washing pets generally becomes so difficult that the pets are often not bathed at all, which leads to a variety of problems like mange on the skin, and in the ears, flea infestation on the pets and in the house along with unpleasant odors. Moreover, the number of abandoned pet is increasing dramatically, and in most instances, the abandonment is due to poor pet hygiene.

Commercial pet groomers use specialized stainless steel tubs for washing and grooming pets. These tubs are expensive, large, cumbersome, and not practical for mobile groomers that make house calls. These commercial grooming tubs also require special hair filters to insure that the drains are not clogged by the excessive amounts of hair from the pets.

People who show pets at the many pet shows through out the country are required to extensively groom their pets on the road which presents great problems of portability and storage for the equipment. Pet stores and people who sell pets find it necessary to keep the pets presentable to the customer, which requires bathing often. Veterinary facilities also require the facilities for bathing pets, but often do not have the room for the large commercial tubs. Some pet care facilities that have a large commercial grooming tub use the one-size-fits-all theory that does not work with the large variety of kinds and sizes of pets. It is very difficult at any facility to have the different sizes and heights of pet bathes required for bathing and grooming the large variety and sizes of pets people have.

There is a continuing need for improved, inexpensive pet bathing and grooming apparatus that comes in a variety of sizes and heights, is convenient and comfortable to use for both the pet and the individual bathing the pet along with being light weight, portable and compact for shipping and storage.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

THE OBJECTS OF THE INVENTION

The principal object of the booster pet bath is to supply an improved portable inexpensive pet bath that will come in a variety of sizes.

Another object of the booster pet bath is to supply a device that can be stored and shipped in a relatively small container.

Another object of the booster pet bath is to supply a device that can quickly be easily assembled and disassembled.

Another object of the booster pet bath is to supply a pet bath that is lightweight and portable either assembled or disassembled.

Another object of the invention is to supply a pet bath with UV protection that can be left outside.

Another object of the invention is to supply a pet bath with an adjustable three-point leash restraint system that securely holds the pet in the center of the bathing area.

Another object of the invention is to supply a pet bath with a non-slip surface that will give the pet a comfortable feeling while being bathed.

Another object of the invention is to supply a pet bath at a comfortable height so that it may be used for trimming and grooming after bathing the pet.

Another object of the booster pet bath is to supply a device on four stable detachable legs and at a convenient height that an individual can stand next to for bathing a pet.

Another object of the invention is to supply a pet bath with a set of stairs available to assist getting the larger pets in and out of the device.

Another object of the booster pet bath is to supply a device with a variety of different lengths of legs to adjust the working height.

Another object of the booster pet bath is to supply a device with a lower leg support system capable of adjusting the height and further stabilizing the legs.

Another object of the booster pet bath is to have a two-piece tub unit that can easily be separated.

A further object is to create booster pet bath with a special trigger actuated directional fan nozzle that will attach to a hose and clip to the side of the tub unit.

A further object is to supply a user with 360 degrees access to a pet while bathing and drying said pet.

Yet another object is to provide a detachable, directional no leak water discharge hose.

Yet another object is to provide a utility basket for holding grooming aid at a convenient height for retrieval.

A further object is to provide a drain and drain hose assembly that is directional for the purpose of choice of discharge location.

A further object is to supply an accessible u-shaped entrance at an acceptable height for easy entry and exit by the pet to be bathed.

A further object is to provide an adjustable 3 point lease restraint system with an adjustable removable collar.

A further object is to provide a recessed rubberized no-slip mat to reduce stress and injury.

A further object is to provide a pet bathing apparatus for indoor and/or outdoor use.

And yet a further object is to provide non-slip rubber pads on each support leg end for the purpose of stabilizing the pet bath from slipping when the pet to be bathed is entering, or exiting, and when the pet bath is in use on a smooth surface.

A final object of this invention is to add a new and improved device to the area of pet supplies.

These together with other objects of the invention, along with the various features of novelty, which characterize the invention, are pointed out with particularity in the claims annexed to and forming a part of this disclosure.

For a better understanding of the invention, its operating advantages and the specific objects attained by its uses, reference should be made to the accompanying drawings and descriptive matter in which there are illustrated preferred embodiments of the invention. There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

SUMMARY OF THE INVENTION

The preferred embodiment of this booster bath will consist of a two piece tub unit that will nest together for shipping and storage along with being able to mate together, attached by the means of fasteners, for the purpose for bathing and grooming pets. Additionally with the top half of the tub removed, the device can be used for a pet trimming and grooming stand. The device will be shipped in a completely disassembled state with the lower portion of the tub nested in the upper portion of the tub, The legs, drain hose, spray nozzle and assembling hardware will fit within the lower portion of the tub along with an optional leg stabilizers and set of access stairs.

With the growing expense of shipping costs, the size of the packaging of articles has become a major design factor. It has been essential that the packaging of products be reduced in size. This is why the tub has been divided into two separate pieces, differing from the original patent of the inventor.

The preferred embodiment of the booster bath will consist of a tub top section that has a reinforced contoured top edge, side wall and an upper mating edge fixably engaging with the lower mating edge of the tub lower section. The rear end of the combined tub sections has a U-shaped opening to aide in moving the pets in and out of the tub. An optional set of access stairs with non-slip pads that are cut to fit within molded cavities will be available. A utility basket for grooming aids is preferably releasably mounted to the tub top section although in some cases it could be attached to the lower section and still be covered within the scope of this patent. A high volume, fan style spray nozzle with an on-off control valve will be supplied. The high volume spray nozzle has a tab for hooking it on the side of the tub and a forty-five degree bend to direct the water downwardly when washing the pet.

A three piece adjustable leash system and collar is shown attached at the separation line of the combination tub sections but may be attached to the top tub section or bottom tub section and still remain within the scope of this patent. The three-piece adjustable leash system will be attached to the combined tub sections by the means of three eyebolts. By using the three-piece adjustable leash system the pet is kept centrally located with in the tub and cannot move from side to side. A quick disconnect swivel snap coupler is attached to the collar so the collar can be put on the pet before moving the pet into the tub.

The combined tub sections slope to the rear when standing with the removable legs in place so that the water will drain to the drain orifice with the drain hose attached. By using four separate removable legs, the person bathing or grooming the pet can stand close to the combined tub sections with their toes under the device. A non-slip pad is cut to fit within a molded pad cavity in the tub lower section. With the non-slip pad located within the molded pad cavity, it insures that the corners or sides of the pad will not lift up or become torn by the pets.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

For a fuller understanding of the nature and objects of the invention, reference should be had to the following detailed description taken in conjunction with the accompanying drawings which are incorporated in and form a part of this specification, illustrate embodiments of the invention and together with the description, serve to explain the principles of this invention.

DETAILED DESCRIPTION OF THE PREFERRED EMBODIMENTS

Figures 1, 1A:
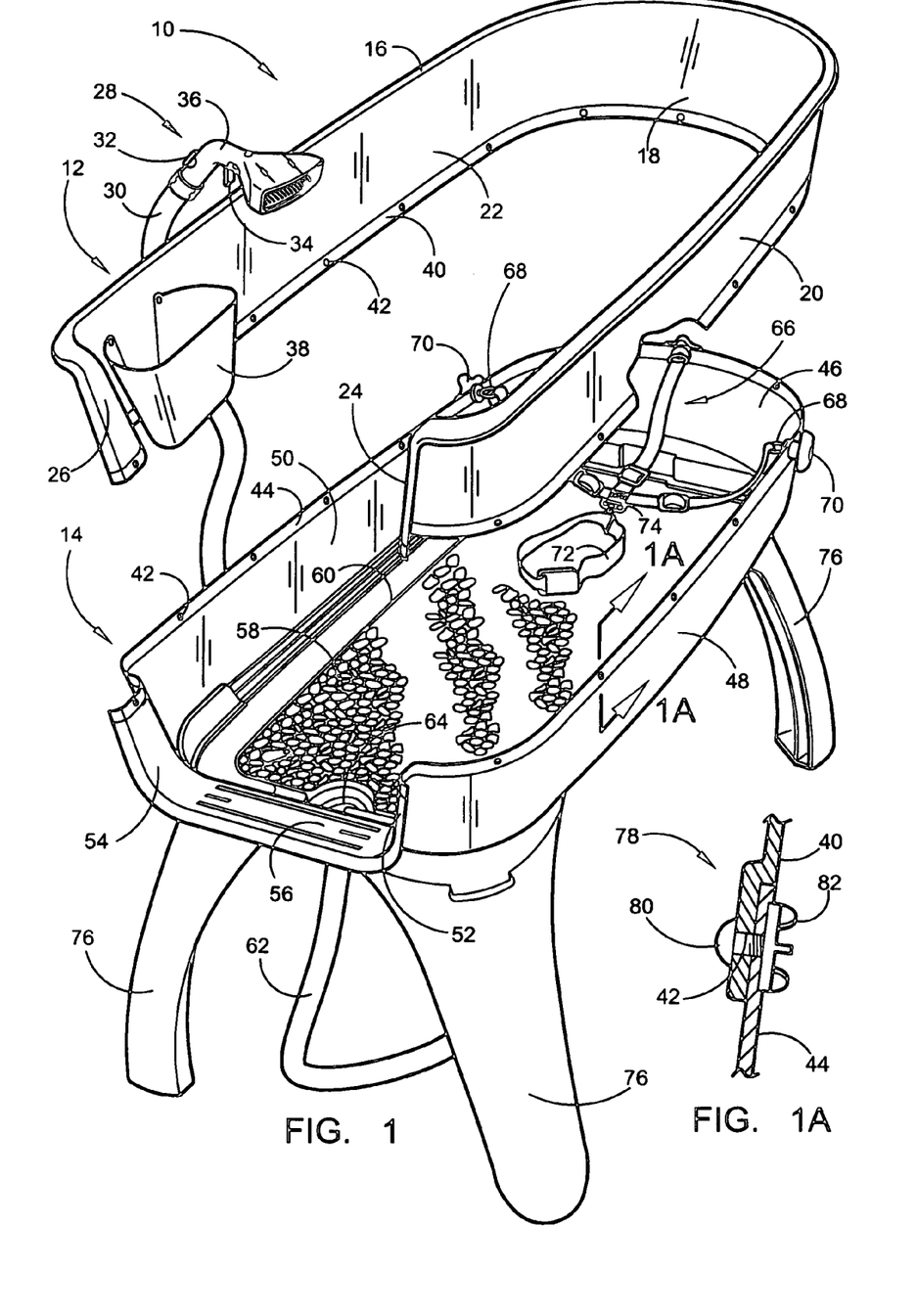
FIG. 1 depicts an exploded perspective view of the booster bath.
FIG. 1A depicts a cross section through the stepped joint between the tub top section and the tub bottom section.

Referring now to the drawings, wherein similar parts of the booster bath 10 are identified by like reference numerals, there is seen in FIG. 1 an exploded perspective view of the booster bath 10 with the tub top section 12 raised above the tub bottom section 14. The tub top section 12 has a rolled reinforced top edge 16, a top section front wall 18, a top section right side wall 20, a top section left sidewall 22 and a top section right side of the U-shaped opening 24 and a top section left side of the U-shaped opening 26. The high volume spray nozzle 28 connected to a conventional garden hose 30 is located above the top section left sidewall 22 equipped with a flow control valve 32 and a tab 34 to hold the spray nozzle 28 on the top edge 16 of the booster bath 10. A forty-five degree bend 36 facilitates directing the flow of water downwardly while bathing the pet. The utility basket for grooming 38 is shown mounted on the rear of the top section left sidewall 22 but it can be mounted at various locations and still remain within the scope of this patent. An upper mating flange 40 with mounting orifices 42 is at the lower edge of the tub top section 12 to attach to the lower mating flange 44 on the tub bottom section 14.

The tub bottom section 14 has a bottom section front wall 46, a bottom section right side wall 48, bottom section left sidewall 50, bottom section right side of the U-shaped opening 52, a bottom section left side of the U-shaped opening 54 with a flat U-shaped opening surface 56. A non-slip pad 58 fits into a recess 60 providing a smooth uniform surface on the tub bottom section 14. Drain hose 62 extends out from the drain orifice 64 in the bottom of the tub bottom section 14. A three-piece adjustable leash system 66 is shown attached on the front of the bottom tub section 14 by the means of eye bolts 68 and hand knobs 70. The collar 72 is attached to the three-piece adjustable leash system 66 by the means of a quick disconnect swivel attachment 74. Typical legs 76 are located at the corners of the tub bottom section 14.

FIG. 1A depicts a cross section through the stepped joint 78 between the tub top section 12 and the tub bottom section 14 where the upper mating flange 40 overlaps the lower mating flange 44 creating a water tight seal. Conventional fasteners such as a button head screw 80 going through the orifices 42 and finger tightening nut 82 hold the tub top section 12 and the tub bottom section 14 together.

Figure 2:
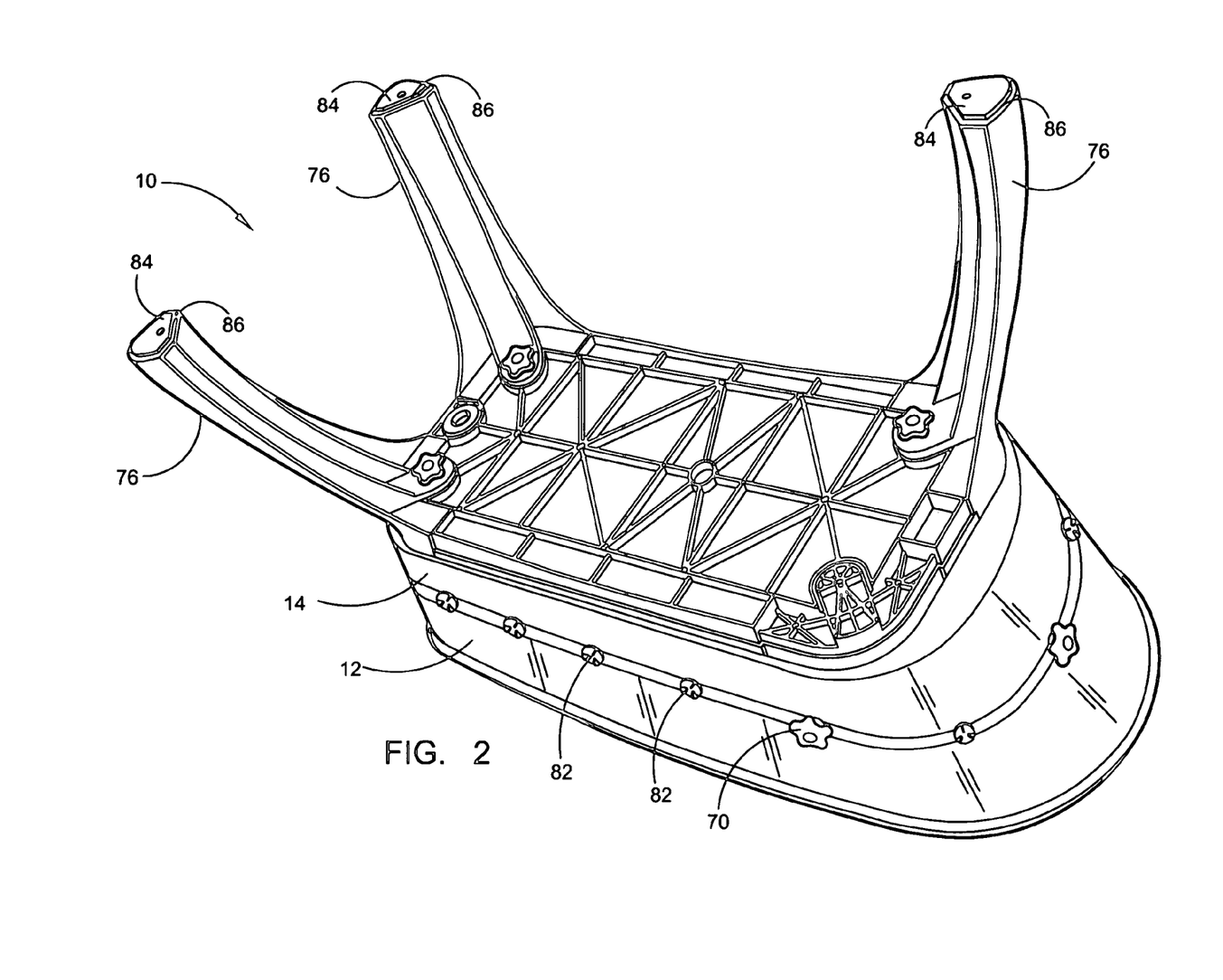
FIG. 2 depicts a perspective view of the under side of the booster bath with one of the legs removed.

FIG. 2 depicts a perspective view of the under side of the booster bath 10 with one of the legs 76 removed additionally illustrating the bottom of the leg 76 where a non slip pad 84 is inserted within a recess 86 keeping the legs from sliding on wet surfaces.

Figures 3, 4, 5:
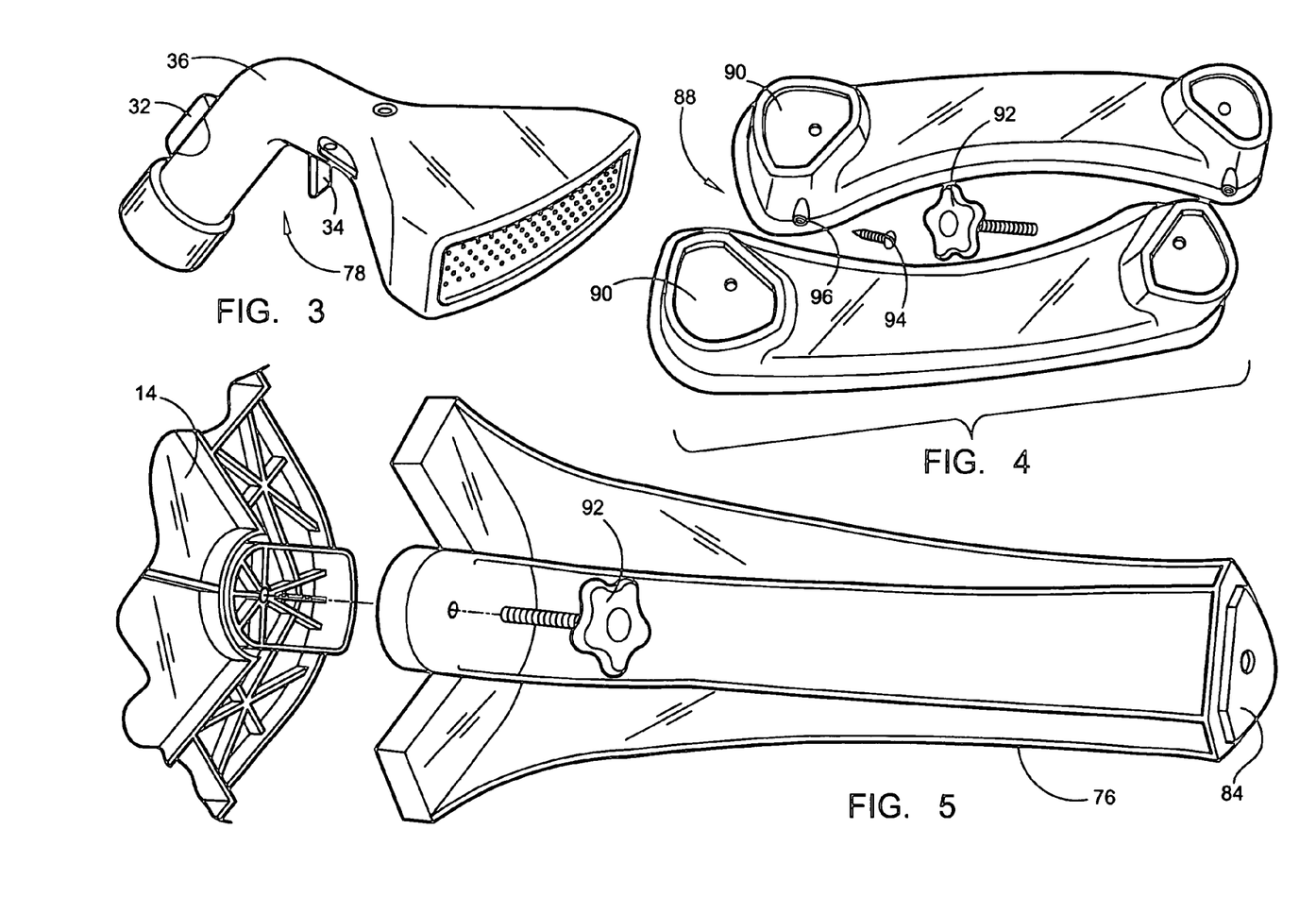
FIG. 3 depicts a perspective view of the high volume spray nozzle.
FIG. 4 depicts a perspective view of the optional leg stabilizers.
FIG. 5 depicts an exploded perspective view of a single removable leg.

FIG. 3 shows a perspective view of the high volume spray nozzle 28 equipped with a flow control valve 32 and a tab 34 to hold the spray nozzle 28. A forty-five degree bend 36 facilitates directing the flow of water downwardly while bathing the pet. FIG. 4 depicts a perspective view of the optional leg stabilizers 88 with a cavity 90 at each end to retain the lower end of the legs 76. The leg stabilizers are attached to the legs 76 by the means of hand knobs 92 and may be permanently attached to the floor surface by the means of the screws 94 going through orifices 96.

Figure 6:
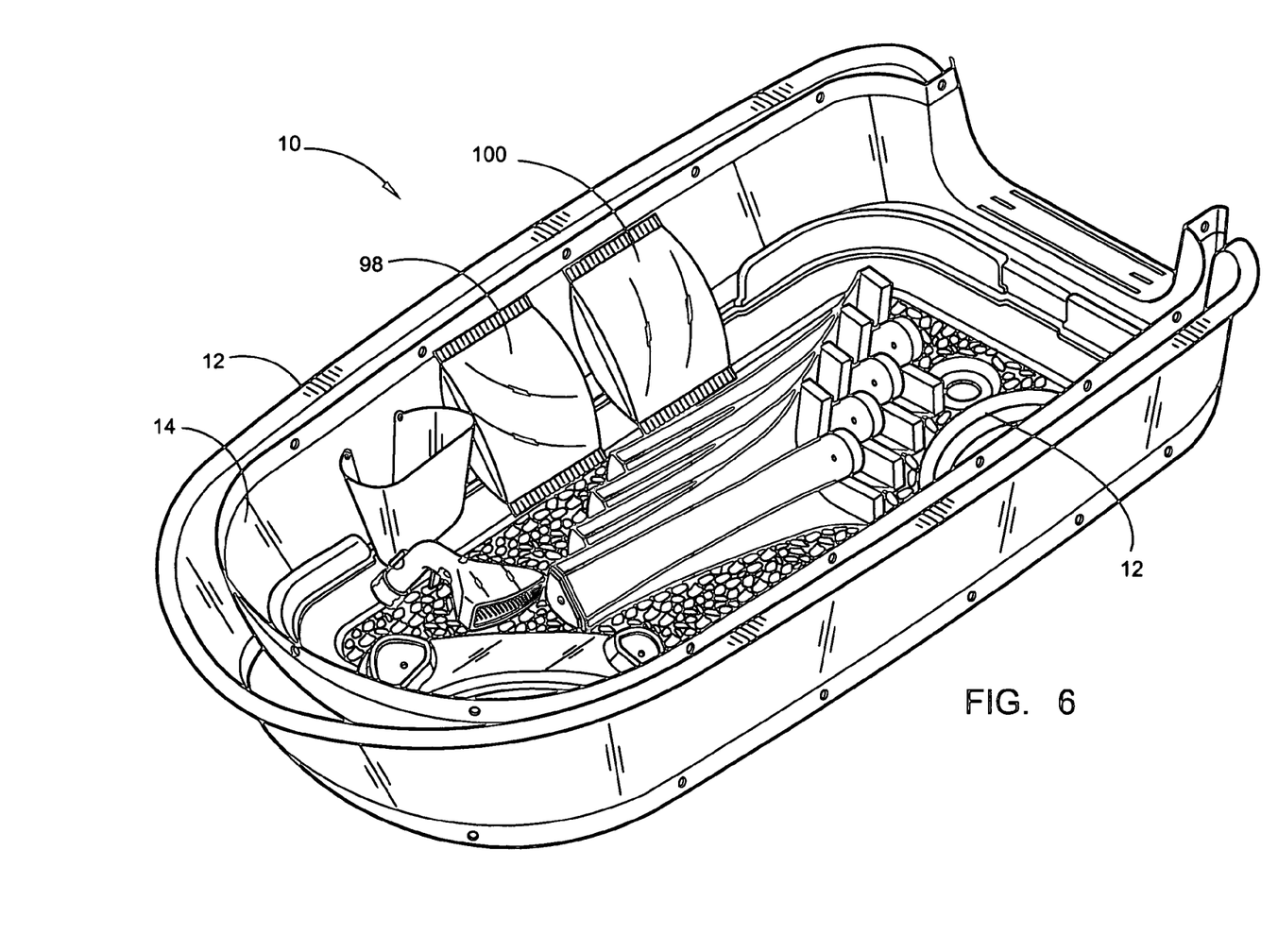
FIG. 6 depicts a perspective view of the booster bath in the shipping condition with the tub bottom section nested in the tub top section and the additional parts resting within the tub bottom section.

FIG. 5 depicts an exploded perspective view of a single removable leg 76 away from the tub bottom section 14 with the mounting hand knob 92. FIG. 6 depicts a perspective view of the booster bath 10 in the shipping condition with the tub bottom section 14 nested in the tub top section 12 and the additional parts resting within the tub bottom section 14 including a bag with the hardware 98 and a bag 100 containing the three-piece adjustable leash system and collar 66.

Figure 7:
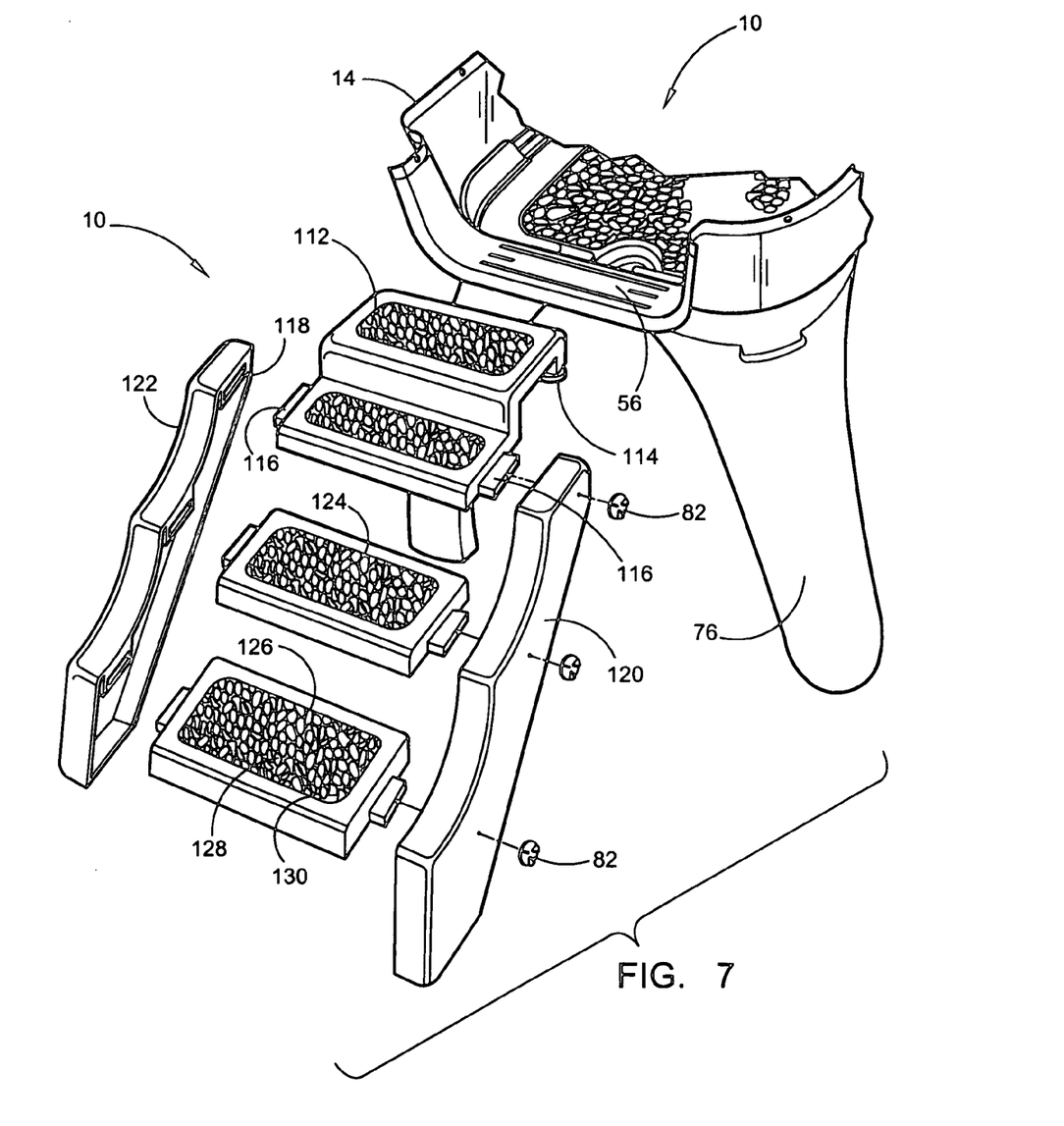
FIG. 7 depicts a perspective view of an optional set of stairs to aide in getting the pets in and out of the booster bath.

FIG. 7 depicts a perspective view of an optional set of stairs 110 to aide in getting the pets in and out of the booster bath 10. The optional set of stairs 110 are made up of a top step 112 that fits over the flat U-shaped opening surface 56 in tub bottom section 14, with a protective rubber bumper 114. A tongue 116 extends from either side to mate with a tongue cavity 118 in the side rails 120 and 122. The side rails 120 and 122 attach to the second step 124 and the third step 126 with the similar tongue 116 and tongue cavity 118 attachment means as with top step 112. Finger tightening nuts 82 will hold the side rails 120 and 122 to the steps 112, 124 and 126. Non-slip pads 128 will fit into depressions 130 in the steps 112, 124 and 126.

The booster bath 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing a booster bath 10 in accordance with the spirit of this invention, and such changes, alternations and modifications as would occur to those skilled in the art are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A compact and elevated pet bath comprising:
    a) a tub assembly, said tub assembly containing a top section and a bottom section, said top section having a peripheral side wall with an opening on one end for the purpose of receiving pets and a first edge containing means for removably attaching said top section to said bottom section, said bottom section having a base and a peripheral side wall extending upwards from said base with an opening in one end that aligns with the opening in said peripheral side wall of said top section for the purpose of receiving pets, said peripheral side wall of said bottom section having a mating edge for the purpose of removably attaching said bottom section to said top section; and
    b) two or more support members removably attached to said bottom section whereby a user places a pet in the tub assembly for bathing or grooming and said tub assembly can be disassembled and compactly shipped or stored with said top section and said two or more support members nested within said bottom section; and c) further comprising a set of detachable stairs for placement near and through the opening in the peripheral side wall of said bottom section for the purpose of facilitating the movement of pets into and out of said tub assembly wherein said set of detachable stairs comprises:
   i) two side rails, one side of each of said two side rails containing a first tongue accepting cavity, a second tongue accepting cavity, and a tongue accepting cavity positioned thereon;
   ii) a first step for positioning over and through the opening in the peripheral side wall of said bottom section, said first step containing a tongue protruding from each side for positioning within said first tongue accepting cavity of each of said two side rails;
   iii) a second step for positioning below said first step, said second step containing a tongue protruding from each side for positioning within said second tongue accepting cavity of each of said two side rails; and
   iv) a third step for positioning below said second step, said third step containing a tongue protruding from each side for positioning within said third tongue accepting cavity of each of said two side rails.

2. The compact and elevated pet bath of claim 1, wherein said peripheral side wall of said top section further comprises a reinforced second edge with a contoured shape for the purpose of containing water within the pet bath.

3. The compact and elevated pet bath of claim 1, wherein said bottom section contains a drain outlet located within said base.

4. The compact and elevated pet bath of claim 3 further comprising an angled and adjustable drain hose removably attached to said drain outlet for the purpose of enabling water to flow in any direction from the pet bath.

5. The compact and elevated pet bath of claim 1, wherein said top section is removably attached to said bottom section by means of conventional fasteners.

6. The compact and elevated pet bath of claim 1, wherein the opening in said tub assembly created by the attachment of said top section to said bottom section is U-shaped for the purpose of allowing movement into and out of said tub assembly by pets of various sizes.

7. The compact and elevated pet bath of claim 1 further comprising an adjustable restraint system removably attached to said tub assembly for the purpose of preventing lateral and longitudinal movements of the pet during bathing and grooming, said adjustable restraint system comprising a leash system and a collar removably attached to said leash system.

8. The compact and elevated pet bath of claim 7, wherein said leash system is comprised of at least two adjustable leashes fixedly attached at one end, the other end of each of said at least two adjustable leashes containing means for removable attachment of said leash system to said tub assembly.

9. The compact and elevated pet bath of claim 7, wherein said collar is removably attached to said leash by a swivel attachment for the purpose of allowing a quick disconnect of the collar from said adjustable restraint system.

10. The compact and elevated pet bath of claim 1 further comprising a non-slip material positioned on the interior surface of said base for the purpose of preventing slippage of the pet during bathing and grooming.

11. The compact and elevated pet bath of claim 1 further comprising a utility basket removably attached to said tub assembly for the purpose of holding grooming tools and other items used for bathing and grooming pets.

12. The compact and elevated pet bath of claim 1, wherein the distal end of each of said two or more support members contains a non-slip surface for the purpose of preventing slippage of the pet bath during use.

13. The compact and elevated pet bath of claim 1, wherein each of said two or more support members are removably attached to said bottom section by a hand knob.

14. The compact and elevated pet bath of claim 1 further comprising one or more members removably attached to said two or more support members for the purpose of providing stability to the pet bath during use.

15. A detachable set of stairs for placement adjacent to a pet bath comprising:
   a) two side rails, one side of each of said two side rails containing a first tongue accepting cavity, a second tongue accepting cavity, and a third tongue accepting cavity positioned thereon;
   b) a first step containing a tongue protruding from each side for positioning within said first tongue accepting cavity of each of said two side rails;
   c) a second step for positioning below said first step, said second step containing a tongue protruding from each side for positioning within said second tongue accepting cavity of each of said two side rails; and
   d) a third step for positioning below said second step, said third step containing a tongue protruding from each side for positioning within said third tongue accepting cavity of each of said two side rails
   whereby the detachable set of stairs facilitate the movement of pets into and out of the pet bath.

16. The detachable set of stairs of claim 15 further comprising a non-slip material positioned on the exterior surface of each of said first step, said second step, and said third step for the purpose of preventing slippage of the pet during use.

17. The detachable set of stairs of claim 15 further comprising a rubber bumper coupled to and positioned underneath said first step for the purpose of preventing slippage of the detachable set of stairs when in contact with the pet bath.

18. A method for making a compact and elevated pet bath comprising the steps of:
   a) providing a tub assembly, said tub assembly containing a top section and a bottom section, said top section having a peripheral side wall with an opening on one end for the purpose of receiving pets and an edge containing means for removably attaching said top section to said bottom section, said bottom section having a base and a peripheral side wall extending upwards from said base with an opening in one end that aligns with the opening in said peripheral side wall of said top section for the purpose of receiving pets, said peripheral side wall of said bottom section having a mating edge for the purpose of removably attaching said bottom section to said top section;
   b) providing two or more support members for removable attachment to said tub assembly; and
   c) removably attaching said two or more support members to said tub assembly; and
      i) providing a detachable set of stairs for placement adjacent to a pet bath comprising:

ii) two side rails, one side of each of said two side rails containing a first tongue accepting cavity, a second tongue accepting cavity, and a third tongue accepting cavity positioned thereon;

iii) a first step containing a tongue protruding from each side for positioning within said first tongue accepting cavity of each of said two side rails;

iv) a second step for positioning below said first step, said second step containing a tongue protruding from each side for positioning within said second tongue accepting cavity of each of said two side rails; and v) a third step for positioning below said second step, said third step containing a tongue protruding from each side for positioning within said third tongue accepting cavity of each of said two side rails whereby the detachable set of stairs facilitate the movement of pets into and out of the pet bath.

* * * * *